United States Patent
Kurose et al.

[15] 3,689,828
[45] Sept. 5, 1972

[54] MANUALLY CONTROLLED CASE DEPTH MEASURING INSTRUMENT WITH INDICATORS TO GUIDE ITS USE

[72] Inventors: Tadashi Kurose; Ryuichi Kagaya, both of Katsuta; Kunio Ono; Kimio Kanda, both of Hitachi, all of Japan

[73] Assignee: Hitachi, Ltd., Marunouchi, Chiyoda-ku, Tokyo, Japan

[22] Filed: March 17, 1970

[21] Appl. No.: 20,218

[52] U.S. Cl. .............................................. 324/34 R
[51] Int. Cl. ............................................ G01r 33/12
[58] Field of Search ................... 324/34 R, 34, 45, 40

[56] References Cited

UNITED STATES PATENTS

| | | | |
|---|---|---|---|
| 3,490,033 | 1/1970 | Elarde | 324/34 R |
| 2,097,947 | 11/1937 | Fahy | 324/34 R |

FOREIGN PATENTS OR APPLICATIONS

| | | | |
|---|---|---|---|
| 871,185 | 3/1953 | Germany | 324/43 |

OTHER PUBLICATIONS

McMaster, R., Nondestructive Testing Handbook; Vol. II The Ronald Press; 1963, New York, pp. 34.1, 34.2, 34.3.

McMaster, R., Nondestructive Testing Handbook, Vol. II, The Ronald Press, 1963, New York, pp. 34.1, 34.2, 34.3, 34.5.

Primary Examiner—Robert J. Corcoran
Attorney—Craig, Antonelli and Hill

[57] ABSTRACT

A case depth measuring instrument for measuring the depth of the hardened layer of a steel to be tested, by impressing a D.C. magnetic field on said steel locally from its external quenched surface, measuring the magnetic flux of said field by means of a hall element while varying the magnetomotive force of said field and reading the value of the coercive force of said field at the point when the magnetic flux has reached zero.

3 Claims, 6 Drawing Figures

MANUALLY CONTROLLED CASE DEPTH MEASURING INSTRUMENT WITH INDICATORS TO GUIDE ITS USE

BACKGROUND OF THE INVENTION

The present invention provides means for non-destructively determining the depth of the hardened layer or carbon content, of a given steel.

As this type of means, there has generally been employed a method which comprises preparing a small test sample by destroying a piece of the steel to be tested and conducting a hardness test by mechanical means or chemical analysis on said sample piece to determine the property of the steel. The method, therefore, has the big drawback that not only was the operation efficiency very low, but also the method was not applicable to certain types of steel.

SUMMARY OF THE INVENTION

The present invention enables the measuring of the depth of the hardened layer of steels to be tested by a method entirely different from the prior art method described above, and an object thereof is to provide a steel testing instrument by which the depth of the hardened layer to be determined of a given steel is measured non-destructively.

The object of the invention is to provide a steel testing instrument of the character described, which is extremely simple in circuit arrangement and yet capable of measurement with high efficiency and accuracy.

DETAILED DESCRIPTION OF THE PREFERRED EMBODIMENTS

Figure 1:
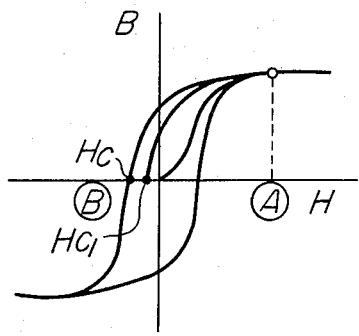
FIG. 1 is a graph showing the hysteresis curves of steel.

In FIG. 1 which shows the magnetic hysteresis curves of steel at a hardened portion and an unhardened portion respectively, symbol $Hc_1$ indicates the coercive force of the unhardened portion and $Hc$ the coercive force of the hardened portion. In general, the coercive force is greater at the hardened portion than at the unhardened portion.

Figure 2:
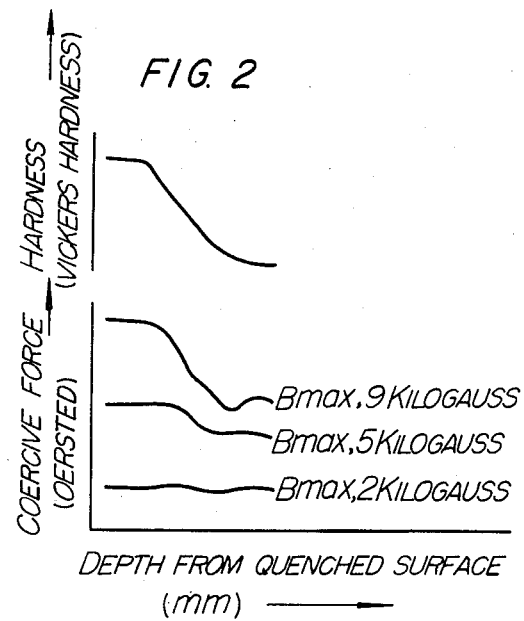
FIG. 2 is a graph showing the relationship between the hardness and the coercive force, and the depth of hardened layer, of steel, for the purpose of explaining the principle behind the present invention.

Further, as will be seen from the experimental results of FIG. 2, the coercive force of steel decreases with the hardness which varies as the depth from the quenched surface increases. In FIG. 2, symbol $Bmax$ is the maximum flux $B$ in FIG. 1.

Generally speaking, a hardened layer is not distinctive in forged steel rolls, etc., as shown in FIG. 2. Namely, the steel shows a substantially constant high hardness to a certain depth from the surface thereof and then the hardness decreases gradually as the distance from the surface increases. However, since the coercive force varies with hardness, the approximate depth of the hardened layer can be judged by penetrating a magnetic flux sufficiently deeply from the steel surface and then measuring the mean coercive force of the flux penetrating portion.

Figure 3:
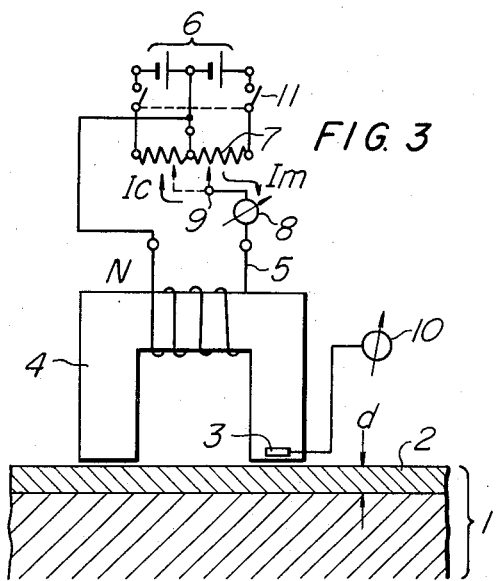
FIG. 3 is a diagram showing the construction of one embodiment of the present invention.

An embodiment of the present invention, which measures hardness penetration based upon the above-described principle, will be described hereunder:

With reference to FIG. 3, reference numeral 1 designates a steel having, for instance, a hardened layer 2. Reference numeral 3 designates a Hall generator for detecting a magnetic flux, which is mounted in a leg of a magnetic field producing electromagnet 4. Reference numeral 5 designates an exciting coil for the electromagnet 4, and 6 designates a D.C. power source which supplies positive and negative D.C. currents to said exciting coil. Reference numeral 7 designates a variable resistor having a contact 9, through which the variable D.C. current is supplied to the exciting coil 5. Reference numeral 8 designates an ammeter to measure the exciting current, 10 a voltmeter to measure the output voltage of the Hall generator 3, and 11 an on-off switch for the power source 6.

With the construction described above, a current $Im$ is, first of all, supplied to the coil 5 from the power source 6 through the resistor 7 and the ammeter 8, upon turning the switch 11 on, thereby to excite the hardened layer 2 sufficiently to a point A shown in FIG. 1. Then, the output voltage of the Hall generator 3 is reduced to zero, by moving the contact 9 of the resistor 7 in an opposite direction while watching the varying output of said Hall generator on the voltmeter 10, whereby the magnetic position of the hardened layer reaches to a point B of FIG. 1. Namely, with Ic representing the current at this time and N representing the number of turns of the coil 5, the product of $Ic \times N$ has a close relation with the product of $Hc \times d$, wherein Hc stands for the coercive force of the hardened layer and $d$ stands for the depth of said hardened layer. The depth of the hardened layer of the steel can be measured based on this relation.

According to this type of instrument, the measurement accuracy can be enhanced by increasing the sensitivity of the Hall generator 3.

In measuring the coercive force of the magnetic circuit in the manner described, if a material having a very small coercive force, such as pure iron, is used for the core of the electromagnet 4, the coercive force measured will directly represent the coercive force of the steel 1 to be measured. Further, by selecting the electromagnet 4 in such a manner as to penetrate the magnetic flux sufficiently deeper than the depth of the hardened layer from the surface of the steel 1, the measured coercive force is shown in its mean value, and the hardened portion and the portion deeper than that show different coercive forces as shown in FIG. 2. After all, the measured coercive force corresponds to the depth of the hardened layer. Therefore, if the instrument is previously calibrated based on a test piece having a specific hardness penetration, it is possible to measure the depth of the hardened layer a given steel accurately and non-destructively in a highly efficient manner.

As described above, the present invention makes use of a hall generator for the measurement of a magnetic field, so that the magnetic field can be measured with high sensitivity and hence the depth of the hardened layer can be measured with high sensitivity. In addition, since the Hall generator is small in size, the space required for the insertion of said generator is very small. This is advantageous in minimizing the error caused by flux leakage at the space or the consumption of the electromotive force by the space. It is, thus, possible to obtain a non-destructive steel testing instrument for measuring the depth of the hardened or penetration layer, which is highly accurate and compact in size.

In the practice of hardening, it is a general requirement that the surface hardness and hardness penetration of the hardened steel fall in predetermined ranges respectively. The surface hardness can be measured by a hardness meter. Therefore, the depth of the hardened layer is measured practically on those steels whose surface hardnesses are within the predetermined range. According to the experiments conducted by the present inventors, it has been confirmed that, with the present instrument of the type described above, the depth of the hardened layer can be measured very accurately, with a fluctuation of only ± 10 percent.

Figure 4:
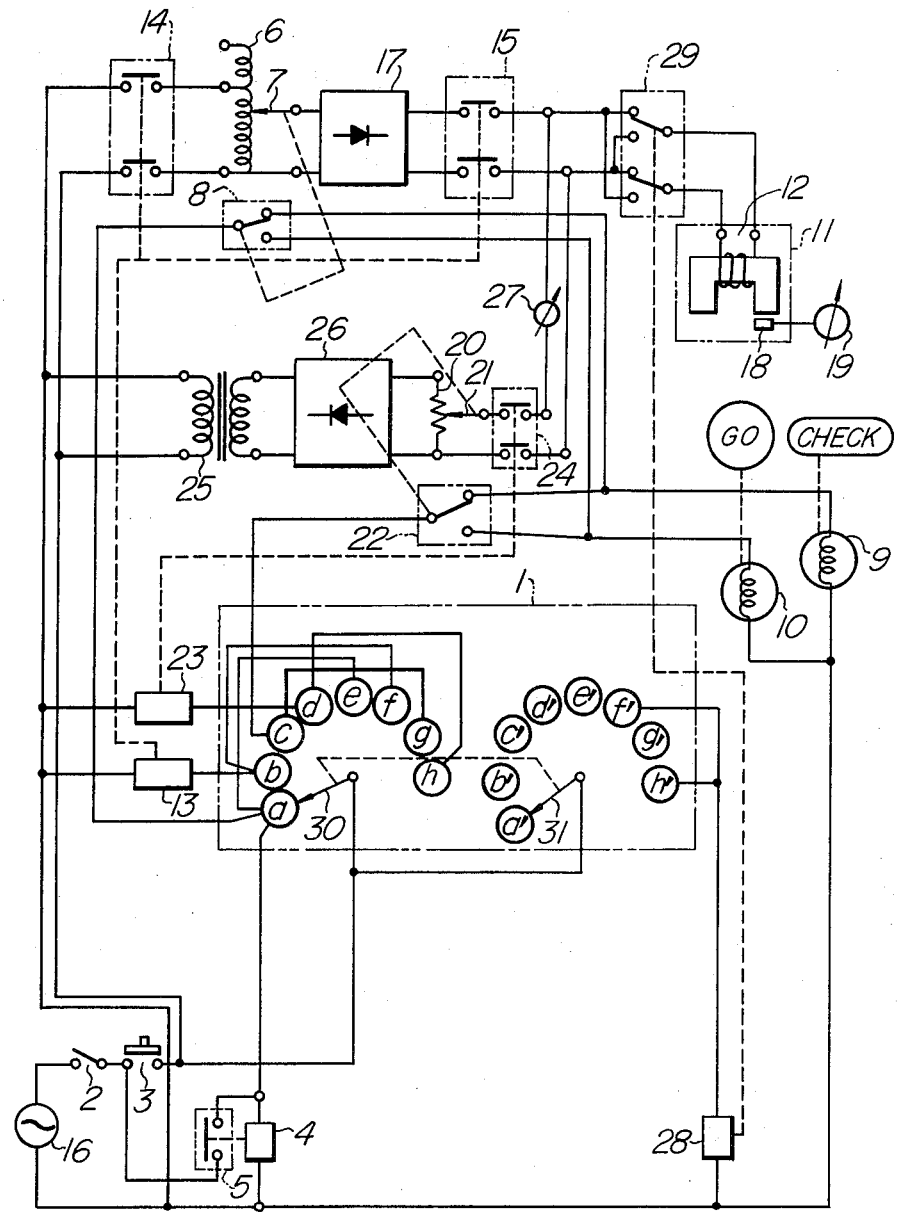
FIG. 4 is a diagram showing the construction of another embodiment of the invention.

FIG. 4 shows another embodiment of the present invention which is an improvement over the preceding embodiment of FIG. 3 in that the circuit arrangement is modified to facilitate the practical use of the instrument. Namely, the embodiment of FIG. 3 is of a construction which merely shows the principle of this invention. Therefore, it will have the following disadvantages, if it is used as such.

1. If the on-off switch 11 is inadvertently turned on, with the contact 9 of the resistor 7 being located at either end of said resistor, the electromagnet 4 is abruptly excited concurrently with the switch operation. The electromagnet is generally imparted with a magnetizing force of several thousand ampere-turns for the sake of stable measurement, so that its attractive force for magnetic materials is extremely large. Therefore, if the electromagnet is not on the steel to be measured but, for example, on a desk, there is the danger of the measurer having his finger injured by being pinched between the electromagnet and a screw-driver, cutting pliers or other magnetizable material attracted by said electromagnet.

2. In exciting the steel to be measured up to the point A in FIG. 5, it is advantageous to maintain the magnetic flux, impressed on the steel from the electromagnet, constant for enhancing the accuracy of the measurement value. To excite the steel unnecessarily vigorously to a point A' or to excite the same to a leaser extent as at a point A'' is undesirable. At any rate, the excitation should be effected from the zero position to a predetermined magnetized state.

3. The value of the measurement taken at the point B in FIG. 5, i.e., Ic × N, is very small relative to the magnetizing force of several thousand ampere-turns of the magnet at the point A of excitation, and is only several hundred ampere-turns. It is, therefore, preferable to provide a power source to obtain the magnetized state represented by the point A and a power source to obtain the magnetized state represented by the point B separately from each other. However, in order to obtain the magnetized state at the point A, it is always desirable to increase the measuring current progressively from the zero until finally the magnetized state reaches the point B. This is because, if the point B in advertently passed and the magnetized state of the steel has reached, for example, a point E, the magnetized state cannot be returned to the point B but is shifted to a point F, even when the measuring current is decreased, and a large measurement error will result.

Such phenomenon is inevitable by reason of the hysteresis characteristic of magnetic materials. It is, therefore, essential that the measuring current is added slowly from a value above zero, which is at least smaller than the value which will have been determined as a result.

The above-described precautions are applicable not only to the points A and B, but also to the points C and D, and are generally hard to exercise for the measurer, even if they are explicitly mentioned in a direction or the like which explains the handling procedure of the product instrument. Thus, failure resulting from improper handling often becomes a problem.

As contrasted, the instrument according to the present invention enables the observer to attain the desired measurement in a satisfactory manner, without giving any particular precaution even when such operational precautions as set forth above are not fully made known to the observer. The present invention will be described hereinafter with reference to the embodiment shown in FIG. 4.

Referring to FIG. 4, reference numeral 1 designates a rotary switch comprising fixed contacts $a$–$h$ and $a'$–$h'$, and movable contacts 30, 31. This rotary switch 1 provides the following circuit conditions by various combinations of the movable contact positions specified below:

Positions $a$, $a'$ — The instrument can be connected with the power source in these positions. Whether the condition should be advanced to the next stage or not is determined.

Figure 5:
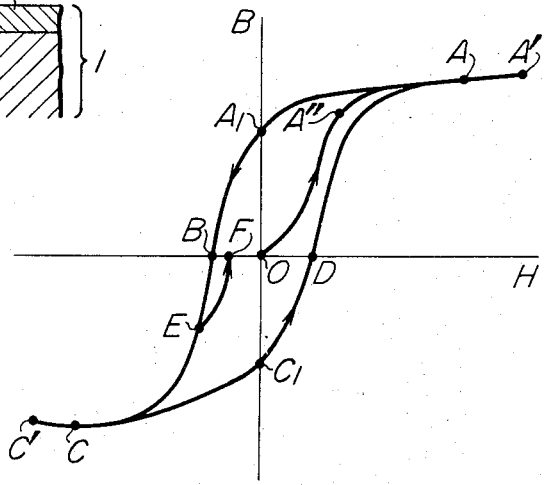
FIG. 5 is a graph showing the hysteresis curves of steel, for explaining the embodiment of FIG. 4.

Positions $b$, $b'$ — The conditions for the first excitation are arranged. Namely, the state of the point A in FIG. 5 is created.

Positions $c$, $c'$ — Whether the condition should be advanced to the next stage or not is determined.

Positions $d$, $d'$ — The conditions for the first measurement are arranged. Namely, the point B in FIG. 5 is measured.

Positions $e$, $e'$ — Whether the condition should be advanced to the next stage or not is determined.

Positions $f$, $f'$ — The conditions for the second excitation are arranged. Namely, the state of the point C in FIG. 5 is created.

$g$, $g'$ — Whether the condition should be advanced to the next stage or not is determined.

Positions $h$, $h'$ — The conditions for the second measurement are arranged. Namely, the point D in FIG. 5 is measured.

The construction and the function of the embodiment of the present invention will be described hereinafter:

As stated, reference numeral 1 designates a rotary switch having the contacts $a$–$h$ and $a'$–$h'$. Reference numeral 2 designates an on-off switch, 3 a push button switch and 4 a relay to operate a normally opened contact 5. Reference numeral 6 designates a slide transformer having a sliding member 7, and 8 designates a microswitch to detect the zero-position of the sliding member 7, which is mechanically connected with said sliding member. Reference numerals 9 and 10 designate indicator lamps to illuminate "CHECK" and "GO" sign plates respectively, 11 an electromagnet having an exciting coil 12, and 13 relay to operate normally opened contacts 14 and 15. Reference numeral 16 designates an A.C. power source, 17 a rectifying circuit, 18 a Hall generator mounted within the magnetic field of said electromagnet 11, 19 a voltmeter to indicate the output voltage of said Hall generator 18, and 20 a variable resistor having sliding member 21. Reference numeral 22 designates a microswitch to detect the zero-position of the sliding member 21 of the variable resistor 20, which is mechanically connected with said sliding member 21, and 23 designates a relay to operate a normally opened contact 24. Reference numeral 25 designates a power source transformer, 26 a rectifying circuit, 27 an ammeter to measure the current flowing through the exciting coil 12, and 28 a relay to switch a contact 29. Reference numerals 30 and 31 designate the movable contacts of the rotary switch 1, as previously stated.

The instrument of the invention constructed as described is operated in the following manner:

After connecting the instrument with the power source by operating the rotary switch 1 to engage the movable contacts 30, 31 with the fixed contacts a, a' respectively and turning the on-off switch 2 on, the push button switch 3 is depressed, whereupon the relay 4 is energized to bring the contact 5 into a closed position.

As a result, the relay 4 is self-held by the contact 5 and will not be returned to the original position unless the on-off switch 2 is opened. If the sliding member 7 of the slide transformer 6 is not in its zero-position, the microswitch 8 which detects the position of said sliding member 7 is held in engagement with the pole shown, so that the lamp 9 is turned on to illuminate the "CHECK" sign plate. On the other hand, if the sliding member 7 is in its zero-position, the lamp 10 is turned on to illuminate the "GO" sign plate.

Namely, with the rotary switch 1 being in the positions a, a' the instrument can be connected with the power source safely, without giving any electric input to the coil 12 of the electromagnet 11.

Furthermore, when the sliding member 7 of the slide transformer 6 is not in the zero-position, which slide transformer controls the exciting power source so that the excitation in the following state may be effected from the zero-position, the "CHECK" sign plate is illuminated, urging the observer to bring said sliding member 7 to the zero-position.

If the sliding member 7 is in the zero-position, the "GO" sign plate is illuminated, assuring that he can advance the rotary switch 1 to the next stage with a sense of security.

When the rotary switch 1 is shifted to the positions b, b', the relay 13 is actuated to close the contacts 14 and 15. Here, the sliding member 7 of the slide transformer 6 is rotated, whereupon an A.C. voltage corresponding to the rotational angle of said sliding member 7 is impressed from the A.C. power source 16. The A.C. voltage is rectified by the rectifying circuit 17 and the resultant D.C. current is supplied to the coil 12 of the electromagnet 11 to excite the same. By the foregoing operation, the steel to be measured is excited to the point A of FIG. 5. Whether the steel has been excited to the point A or not is detected by the Hall generator 18 provided within the magnetic field of the electromagnet 11, and is confirmed by the voltmeter 19.

Upon completion of the above-described operation, the sliding member 7 is returned to the zero-position, whereby the magnetic characteristic of the steel to be measured is shifted to the point $A_1$ in FIG. 5.

Then, the movable contacts 30, 31 of the rotary switch 1 are advanced to the fixed contacts c, c' respectively. At this time, the lamp 9 or 10 is turned on by the microswitch 22 which detects the sliding member 21 of the variable resistor 20 being in its zero-position, and by the illumination of the "GO" sign plate by the lamp 10 thus turned on, the zero-position of the sliding member 21 is confirmed. The observer can advance the rotary switch 1 to the next stage, once the "GO" sign plate has been illuminated.

When the movable contacts 30, 31 of the rotary switch 1 have been advanced one pitch to the positions d, d' respectively, the relay 23 is actuated to close the contact 24, so that the D.C. voltage of the opposite polarity, passing through the power source transformer 25 and the rectifying circuit 26, is controlled by the variable resistor 20 and supplied to the coil 12 of the electormagnet 11.

Thus, the sliding member 21 of the variable resistor 20 is started from its zero-position reliably and thereby the state of the steel is shifted from the point $A_1$ toward the point B or to bring the indication of the voltmeter to zero. The reading from the ammeter 27 at the point when the indication of the voltmeter 19 is zero, is the measured current $Ic_1$.

The first measurement is completed by the foregoing step, then the measurements for the second time can be attained by repeating the same procedure as described above and the measured current $Ic_2$ is obtained. An accurate current value Ic free from any error can be obtained by taking the average of the $Ic_1$ and $Ic_2$, i.e. $Ic = (Ic_1 + Ic_2)/2$.

When the movable contacts of the rotary switch 1 are shifted to the positions f', h', the relay 28 is actuated to switch the contact 29, so that the exciting current and the measuring current are supplied to the electromagnet 11 in a polarity opposite to that of the first time.

The above-described operation is summarized in the table below, with reference to FIG. 5, wherein I is the position of the rotary switch 1 (the positions of the movable contacts); II is the operation in said position of the rotary switch; and III is the point in FIG. 5.

| I | II | III |
|---|---|---|
| Positions a, a' | Check | Point O |
| Positions b, b' | Excitation by positive polarity power source | From Point O to point A via point A'' |
| Positions c, c' | Check | Point $A_1$ |
| Positions d, d' | First measurement is completed upon exciting negative polarity power source. | From point $A_1$ to point B |
| Positions e, e' | Check | point B |

| | The positive polarity power source is excited in an opposite direction | From point B to point C via point E |
|---|---|---|
| Positions $f, f'$ | | |
| Positions $g, g'$ | Check | Point $C_1$ |
| Positions $h, h'$ | Second measurement is completed upon exciting the negative polarity power source. | From point $C_1$ to point D |

Figure 6:
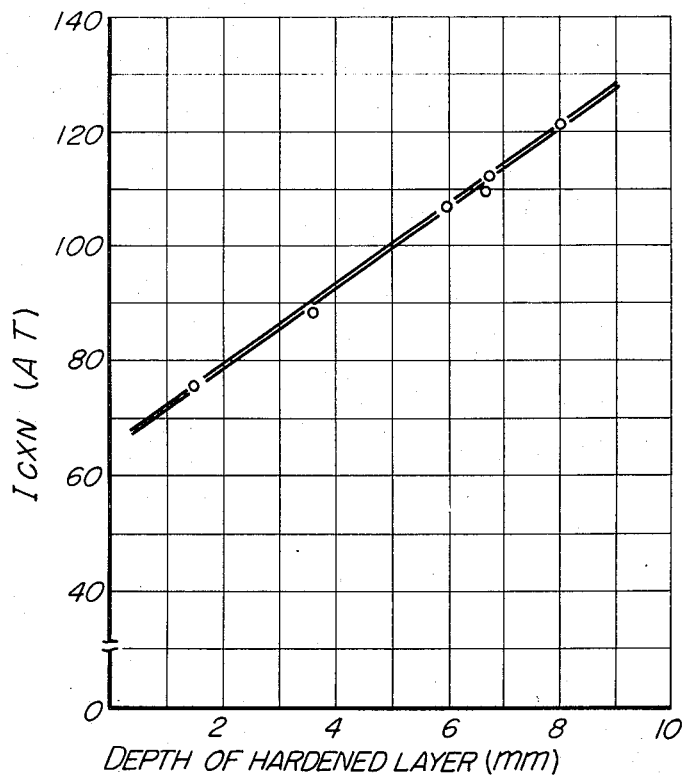
FIG. 6 is a graph exemplifying the result of the actual measurement on a quench hardened layer, according to the present invention.

FIG. 6 exemplifies the depth of the hardened layer actually measured on a steel, containing 0.84 percent of carbon and 2.1 percent of chromium, which had been subject to an induction heating and subsequent quenching. The ampers turns of the electromagnet is 100 when the number of turns N of the coil 12 is 1,000 and the measuring current $Ic$ is 0.1A. Therefore, the hardness penetration $d$ of the steel, calculated from FIG. 6, is 5 mm.

From the forgoing description, it will be seen that the three problems possessed by the instrument of FIG. 3 can be totally solved by constructing the instrument as shown in FIG. 4.

More specifically, the problem mentioned in (1) above can be solved by arranging such that the power can be supplied to the instrument only at a specific position of the rotary switch 1.

The problems mentioned in (2) and (3) above are avoided by the checks conducted prior to the measurement.

It is added that, while the description herein might give an impression that the testing instrument according to the present invention is extremely complicated, the actual construction and operation of the instrument are very simple and easy, and the measurement can be completed quickly.

As described above, the testing instrument of the present invention is provided with the functions of determining the time when the power is to be supplied thereto and confirming the circuit conditions for the next stage prior to the current supply. Therefore, there can be obtained the advantages that the measurement accurary can be enhanced and that the operational error can be avoided completely.

Although the foregoing description of the preferred embodiments of the present invention, reference was made particularly to the use of the instrument for the measurement of the depth of the hardened layer of steel, it is to be understood that the use of the instrument is not restricted only thereto but the instrument can be used for the measurement of the carbon content of steel by measuring the coercive force the steel.

What is claimed is:

1. A case depth measuring instrument for determining the depth of a hardened layer of a steel to be tested comprising
   electromagnet means for impressing a D.C. magnetic field on said steel locally from its external quenched surface including an electromagnet having a main winding,
   a voltage source for energizing said electromagnet,
   first circuit means for selectively connecting said voltage source to said main winding of said electromagnet including first adjusting means for adjusting the magnetomotive force of said electromagnet,
   second circuit means for selectively connecting said voltage source to said main winding of said electromagnet in reverse polarity to the first circuit means including second adjusting means for adjusting the magnetomotive force of said electromagnet and force measuring means connected in series with said second adjusting means for measuring the magnetomotive force of said D.C. magnetic field,
   flux measuring means disposed within the magnetic field generated by said electromagnet for measuring the magnetic flux of said magnetic field,
   switching means for selectively actuating said first circuit means or said second circuit means, and
   indicator means responsive to said first and second adjusting means for indicating the zero condition of said magnetomotive force of said electromagnet, whereby the measured magnetomotive force at the time the flux measuring means reads zero is a measure of the coersive force of the steel from which the case depth can be determined.

2. A case depth measuring instrument as defined in claim 1 wherein said indicator means includes a first indicator energized when said magnetomotive force is zero and a second indicator energized when said magnetomotive force is not zero.

3. A case depth measuring instrument as defined in claim 2 wherein said switching means includes a multi-contact switch connected to said voltage source and relay means controlled by said multi-contact switch for sequentially enabling said first and second circuit means, said indicator means being connected to said multi-contact switch so as to be energized each time prior to the respective enabling of said first and second circuit means.

* * * * *